(12) United States Patent
Wilson et al.

(10) Patent No.: US 10,480,309 B2
(45) Date of Patent: Nov. 19, 2019

(54) METHODS AND SYSTEMS EMPLOYING FIBER OPTIC SENSORS FOR ELECTROMAGNETIC CROSS-WELL TELEMETRY

(71) Applicant: HALLIBURTON ENERGY SERVICES, INC., Houston, TX (US)

(72) Inventors: Glenn Andrew Wilson, Singapore (SG); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 15/531,384

(22) PCT Filed: Dec. 31, 2014

(86) PCT No.: PCT/US2014/072993
§ 371 (c)(1),
(2) Date: May 26, 2017

(87) PCT Pub. No.: WO2016/108887
PCT Pub. Date: Jul. 7, 2016

(65) Prior Publication Data
US 2017/0328195 A1    Nov. 16, 2017

(51) Int. Cl.
*E21B 47/022* (2012.01)
*E21B 47/12* (2012.01)
(Continued)

(52) U.S. Cl.
CPC .......... *E21B 47/02216* (2013.01); *E21B 7/04* (2013.01); *E21B 47/06* (2013.01);
(Continued)

(58) Field of Classification Search
CPC ...... E21B 47/02216; E21B 7/04; E21B 47/06; E21B 47/065; E21B 47/122; E21B 49/00;
(Continued)

(56) References Cited

U.S. PATENT DOCUMENTS 3,967,201 A    6/1976  Rorden
5,941,307 A    8/1999  Tubel
(Continued)

FOREIGN PATENT DOCUMENTS

WO    2015/178878    11/2015

OTHER PUBLICATIONS

1st Australian Examination Report for Application No. 2014415559 dated Nov. 17, 2017.
(Continued)

*Primary Examiner* — Yong-Suk Ro
(74) *Attorney, Agent, or Firm* — Jason Sedano; C. Tumey Law Group PLLC

(57) ABSTRACT

A system includes a drillstring with an electromagnetic (EM) transmitter in a first borehole. The system also includes at least one fiber optic sensor deployed in a second borehole. The system also includes a processor configured to demodulate a data stream emitted by the EM transmitter based on EM field measurements collected by the at least one fiber optic sensor.

20 Claims, 5 Drawing Sheets

(51) Int. Cl.
*E21B 7/04* (2006.01)
*E21B 47/06* (2012.01)
*E21B 49/00* (2006.01)
*G01V 8/02* (2006.01)
*G01V 8/24* (2006.01)
*E21B 43/24* (2006.01)

(52) U.S. Cl.
CPC .......... *E21B 47/065* (2013.01); *E21B 47/122* (2013.01); *E21B 49/00* (2013.01); *G01V 8/02* (2013.01); *G01V 8/24* (2013.01); *E21B 43/2406* (2013.01); *E21B 47/12* (2013.01)

(58) Field of Classification Search
CPC ....... E21B 43/2406; E21B 47/12; G01V 8/02; G01V 8/24
See application file for complete search history.

(56) References Cited

U.S. PATENT DOCUMENTS

| | | |
|---|---|---|
| 6,075,462 A | 6/2000 | Smith |
| 6,150,954 A | 11/2000 | Smith |
| 6,160,492 A | 12/2000 | Herman |
| 6,257,334 B1 | 7/2001 | Cyr et al. |
| 6,268,911 B1 | 7/2001 | Tubel et al. |
| 6,288,975 B1 | 9/2001 | Frederick et al. |
| 6,828,547 B2 | 12/2004 | Tubel et al. |
| 7,012,852 B2 | 3/2006 | West et al. |
| 7,049,821 B2 | 5/2006 | Haber et al. |
| 7,898,494 B2 * | 3/2011 | Brune ...................... H01Q 1/04 343/866 |
| 7,954,560 B2 | 6/2011 | Mathiszik et al. |
| 7,997,340 B2 | 8/2011 | Bostick, III et al. |
| 8,011,451 B2 | 9/2011 | MacDonald |
| 2003/0105591 A1 * | 6/2003 | Hagiwara ................ G01V 3/28 702/7 |
| 2004/0117119 A1 | 6/2004 | West et al. |
| 2007/0126594 A1 | 6/2007 | Atkinson et al. |
| 2009/0188665 A1 | 7/2009 | Tubel et al. |
| 2009/0283258 A1 | 11/2009 | Poitzsch et al. |
| 2009/0316528 A1 * | 12/2009 | Ramshaw ............... E21B 44/00 367/83 |
| 2011/0017512 A1 | 1/2011 | Codazzi |
| 2011/0088895 A1 * | 4/2011 | Pop ........................ E21B 7/04 166/254.2 |
| 2012/0092960 A1 * | 4/2012 | Gaston ................. E21B 47/101 367/35 |
| 2012/0139748 A1 | 6/2012 | Hay et al. |
| 2012/0268135 A1 | 10/2012 | Marsala et al. |
| 2014/0035586 A1 | 2/2014 | Rodney |
| 2014/0036628 A1 | 2/2014 | Hill et al. |

OTHER PUBLICATIONS

PCT International Search Report and Written Opinion, dated Dec. 31, 2014, Appl No. PCT/US2014/072993, "Methods and Systems Employing Fiber Optic Sensors for Ranging," Filed Dec. 31, 2014, 14 pgs.

Avdeev, Dimitry E. et al., "Three-Dimensional Electromagnetic Modelling and Inversion from Theory to Application," Surveys in Geophysics, Nov. 2005, pp. 767-799, vol. 26, issue 6, Kluwer Academic Publishers.

Kersey, Alan D., "Optical Fiber Sensors for Permanent Downwell Monitoring Applications in the Oil and Gas Industry," IEICE Trans. Election, vol. E83-C, No. 3, Mar. 2000, pp. 400-404.

Pardo, David et al., "Sensitivity Study of Borehole-to-Surface and Cross-Well Electromagnetic Measurements Acquired with Energized Steel Casing to Water Displacement in Hydrocardo-Bearing Layers," Geophysics, Nov.-Dec. 2008, v. 73, p. F261-F268.

Song, Xi-Jin et al., "Forward Simulation of Remaining Oil Exploration in Cross-well by Time Domain Electromagnetic Method," Communication Software and Networks (ICCSN), 2011 IEEE 3rd International Conference on May 27-29, 2011, Key Lab. of Photo-electric Logging & Detecting of Oil & Gas, Xi''an Shiyou Univ., Xi''an, China, pp. 280-284.

* cited by examiner

METHODS AND SYSTEMS EMPLOYING FIBER OPTIC SENSORS FOR ELECTROMAGNETIC CROSS-WELL TELEMETRY

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than about 10 meters apart.

In operation, the upper well is used to inject steam into the formation. The steam heats the heavy oil, thereby increasing its mobility. The warm oil (and condensed steam) drains into the lower well and flows to the surface. A throttling technique is used to keep the lower well fully immersed in liquid, thereby "trapping" the steam in the formation. If the liquid level falls too low, the steam flows directly from the upper well to the lower well, reducing the heating efficiency and inhibiting production of the heavy oil. Such a direct flow (termed a "short circuit") greatly reduces the pressure gradient that drives fluid into the lower well.

Short circuit vulnerability can be reduced by carefully maintaining the inter-well spacing, i.e., by making the wells as parallel as possible. (Points where the inter-well spacing is smaller than average provide lower resistance to short circuit flows.) In the absence of precision drilling techniques, drillers are forced to employ larger inter-well spacings than would otherwise be desirable, so as to reduce the effects of inter-well spacing variations. Precision placement of neighboring wells is also important in other applications, such as collision avoidance, infill drilling, observation well placement, coal bed methane degasification, and wellbore intersections. Unfortunately, the ranging operations needed to achieve precision placement of neighboring wells are costly and time-consuming. Further, to the extent communications between a bottomhole assembly (BHA) and earth's surface are limited, directional drilling decisions are delayed and/or are based on incomplete information.

BRIEF DESCRIPTION OF THE DRAWINGS

Accordingly, there are disclosed in the drawings and the following description methods and systems employing fiber optic sensors for cross-well telemetry. In the drawings.

Figure 1:
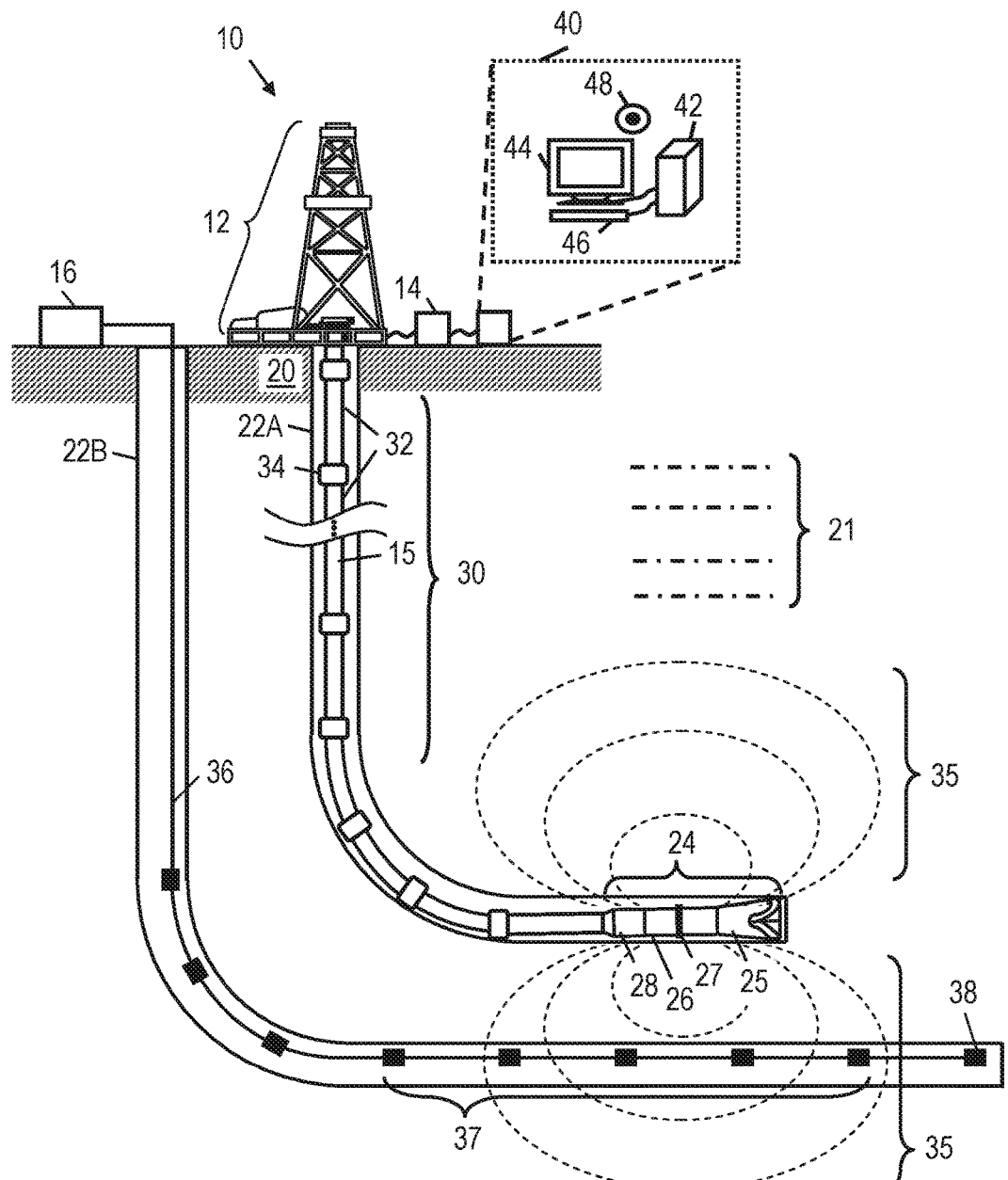
FIG. 1 is a schematic diagram showing an illustrative cross-well telemetry scenario.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems employing fiber optic sensors for electromagnetic (EM) cross-well telemetry. An example method includes emitting a data stream by an EM transmitter in a first borehole. The method also includes obtaining EM field measurements in response to the emitted EM field using an array of fiber optic sensors deployed in a second borehole. The method also includes demodulating the data stream based on the EM field measurements. A related system includes a drillstring with an EM transmitter in a first borehole. The system also includes an array of fiber optic sensors deployed in a second borehole. The system also includes a processor configured to demodulate a data stream emitted by the EM transmitter based on EM field measurements collected by one or more of the fiber optic sensors.

In at least some embodiments, the EM transmitter may be part of a logging-while-drilling (LWD) tool. In such case, the EM transmitter can have multiple roles. For example, in one role, the EM transmitter is used for cross-well telemetry operations. In another role, the EM transmitter is used to collect EM survey data. In yet another role, the EM transmitter may be used for ranging operations. Similarly, the fiber optic sensors may be deployed along a fiber optic cable that serves multiple roles. For example, in one role, the fiber optic cable is used to convey EM field measurements for cross-well telemetry. In another role, the fiber optic cable is used to collect distributed sensing measurements related to pressure, temperature, chemicals, or acoustic activity. In yet another role, the fiber optic cable may be used to convey EM field measurements used for ranging. Other roles are possible. Further, the fiber optic sensors can have multiple roles. In one role, the fiber optic sensors collect EM field measurements for cross-well telemetry. In another role, the fiber optic sensors collect EM field measurements for ranging operations. In yet another role, the fiber optic sensors collect EM survey data (e.g., during production or reservoir monitoring operations). Using cross-well telemetry system components in multiple roles (or using logging/sensing system components for cross-well telemetry) as described herein decreases the overall cost compared to using separate systems. Various component role options, fiber optic sensor options, sensor placement options, and cross-well telemetry options are disclosed herein.

FIG. 1 shows an illustrative cross-well telemetry scenario. In FIG. 1, a drilling assembly 12 enables a drillstring 30 to be lowered and raised in a borehole 22A that penetrates formations 21 of the earth 20. The drillstring 30 includes a plurality of drillstring segments 32 joined by collars or adaptors 34. At the lower end of the drill string 30, a bottomhole assembly 24 (BHA) with a drill bit 25 removes material and penetrates the formations 21 using known drilling techniques. The BHA 24 may include, for example, thick-walled tubulars called drill collars, which add weight and rigidity to aid the drilling process. The thick walls of these drill collars make them useful for housing instrumentation and LWD sensors. In at least some embodiments, the BHA 24 includes a logging tool 26 with at least one EM transmitter 27 and a telemetry/control unit 28. The EM transmitter 27 may be axially oriented as shown or may be tilted relative to the longitudinal axis of the BHA 24. If multiple EM transmitters are used, their position and/or orientation may vary. In at least some embodiments, the EM transmitter 27 emits rotationally invariant EM signals at one or more frequencies (e.g., 100 Hz, 10 kHz, etc.). In this manner, the EM transmitter 27 can be rotated as part of the BHA 24 without degrading cross-well telemetry signals. For example, an EM transmitter 27 that is axially oriented would emit rotationally invariant EM signals.

The logging tool 26 may also include one or more EM field sensor units (not shown) to collect EM survey data in response to EM fields emitted by the EM transmitter 27 and/or ambient EM fields. The telemetry/control unit 28 includes electronics for data storage, communication, etc. Thus, the EM survey data collected by the logging tool 26 may be conveyed to earth's surface and/or is stored by the logging tool 36. In either case, the EM survey data can later be analyzed as a function of position and/or time to determine properties of the formations 19. For example, the EM survey data may be used to derive a permeability log as a function of position, to track movement of downhole fluids, and/or monitor other formation properties. The logs and/or formation properties derived from EM survey data may be displayed to an operator via computer 40.

In at least some embodiments, an interface 14 at earth's surface receives EM survey data or other survey data from the BHA 24 via known telemetry techniques (e.g., mud pulse telemetry, acoustic telemetry, or EM telemetry). The surface interface 14 and/or a computer system 40 may perform various operations such as converting received signals from one format to another, storing survey data, processing survey data, deriving logs from the survey data, and/or displaying logs or other visualization of survey data. Meanwhile, another interface 16 at earth's surface for borehole 22B receives cross-well telemetry data from the fiber optic sensors 38 deployed along the fiber optic cable 36. In different embodiments, the cross-well telemetry data supplements or replaces other telemetry techniques.

The interface 16 may also include optical interrogation components for collecting cross-well telemetry data from the fiber optic sensors 38. The surface interface 16 and/or a computer system 40 may perform various operations such as converting received signals from one format to another, demodulating cross-well telemetry data, storing cross-well telemetry data, processing cross-well telemetry data, deriving logs from the cross-well telemetry data, and/or displaying a representation of the BHA's position or other visualizations related to the cross-well telemetry data. While the interfaces 14 and 16 are shown to be separate, it should be appreciated that at least some functions of the interfaces 14 and 16 could be combined. Further, the computer 40 may be used to store, process, and visualize ranging data, EM survey data, and/or cross-well telemetry data. Alternatively, one or more computers may be employed for EM survey data or ranging data processing and visualization, while one or more other computers are employed for cross-well telemetry data processing and visualization.

In at least some embodiments, the computer system 40 includes a processing unit 42 that processes cross-well telemetry data by executing software or instructions obtained from a local or remote non-transitory computer-readable medium 48. The computer system 40 also may include input device(s) 46 (e.g., a keyboard, mouse, touch-pad, etc.) and output device(s) 44 (e.g., a monitor, printer, etc.). Such input device(s) 46 and/or output device(s) 44 provide a user interface that enables an operator to interact with the logging tool 26 and/or software executed by the processing unit 42. For example, the computer system 20 may enable an operator may select cross-well telemetry data analysis options, to view collected cross-well telemetry data, to view cross-well telemetry data analysis results, and/or to perform other tasks.

To perform cross-well telemetry operations, the EM transmitter 27 emits an EM field 35 that is modulated to convey a data stream. Various modulation techniques are possible (e.g., amplitude modulation, frequency modulation, phase modulation, pulse modulation). The data stream may correspond to raw sensor data, processed data, compressed data, or a combination of different types of data. The EM field 35 is sensed by one or more fiber optic sensors 38 that are part of an array 37 of such sensors 38 deployed in a borehole 22B nearby borehole 22A. While not shown, it should be appreciated that the borehole 22B may correspond to a completed well with casing that has been cemented in place. In such case, the fiber optic sensors 38 may be permanently deployed as part of the well completion process for borehole 22B. For example, each fiber optic sensor 38 may be attached to the exterior of a casing segment by one or more bands or other attachment mechanism. Once the casing is cemented in place, the fiber optic sensors 38 and the fiber optic cable 36 will likewise be cemented in place and will enable ongoing sensing and cross-well telemetry operations. In alternative embodiments, the borehole 22B may correspond to an open well or partially completed well. In such case, the fiber optic sensors 38 may be deployed along an open section in the borehole 22B using wireline and/or pump down operations. Further, in at least some embodiments, the sensitivity of the fiber optic sensors 38 and the EM properties of the borehole fluid and casing may allow for temporary deployment of the fiber optic sensors 38 inside a casing. In such case, wireline and/or pump down operations may enable the fiber optic sensors 38 to be deployed inside a cased section of the borehole 22B. Further, the EM transmitter 27 may be directed to emit EM signals at a lower frequency (e.g., 100 Hz) and/or higher transmitter moments to reduce the affect of the casing on the EM field measurements. As desired, the fiber optic cable 36 and fiber optics sensors 38 used for a temporary deployment scenario may be retrieved and deployed in another well.

The EM field measurements collected by one or more sensors 38 in the array 37 are conveyed to earth's surface via the fiber optic cable 36, which includes one or more optical fibers. It should be appreciated that the spacing of sensors 38 along the fiber optic cable 36 may vary. Further, the manner in which each sensor 38 is coupled to an optical fiber of the fiber optic cable 36 may vary. The availability of multiple optical fibers, optical couplers, and/or reflective components support various options for coupling each fiber optic sensor 38 to the fiber optic cable 36. In operation, the fiber optic sensors 38 generate light in response to an EM field or modulate the intensity or phase of interrogation (source) light in response to an EM field. The generated or modulated light from a given fiber optic sensor 38 provides information regarding the modulated EM field sensed by that given sensor 38. As desired, time division multiplexing (TDM), wavelength division multiplexing (WDM), mode-division multiplexing (MDM) and/or other multiplexing options may be used to recover the measurements associated with each fiber optic sensor 38 deployed along fiber optic cable 36.

In accordance with at some embodiments, the processing unit 42 of computer 40 or circuitry in interface 16 demodulates a data stream obtained from cross-well telemetry, where EM field measurements are collected by one or more of the fiber optic sensors 38. As an example, in order to recover a data stream of 1000 bits/second, it should be appreciated that the sampling rate for the EM field measurements collected by one or more of the fiber optic sensors 38 must be at least 1000 bits/second. Further, knowledge regarding the particular modulation scheme being used is needed to demodulate a data stream obtained from cross-well telemetry. Demodulation may also be facilitated by knowing the position of the EM transmitter 27 relative to one or more of the fiber optic sensors 38. Further, the orientation of one or more EM transmitter 27 and/or the orientation of the fiber optic sensors 38 may be selected so as to increase the signal-to-noise ratio (SNR) and/or range of cross-well telemetry. Further, the fiber optic cable 36 may be shielded to decrease the amount of interference affecting EM field measurements conveyed along the fiber optic cable 36. Further, an inversion algorithm based on rules or laws governing EM fields may be used to account for how the downhole environments affects the EM field emitted by the EM transmitter 27. The inversion algorithm may be based on deterministic and/or stochastic methods of optimization. In at least some embodiments, an anisotropic resistivity model is used for the inversion algorithm. This anisotropic resistivity model can be constructed a priori from seismic data (e.g., 2D/3D/4D seismic survey data, vertical seismic profiling (VSP) survey data, seismic interferometry, acoustic logs, etc.) and/or resistivity data (e.g., resistivity logs obtained from LWD and/or wireline tools). To construct an anisotropic resistivity model, computational algorithms (e.g., well tying or geostatistics) for accurate model constructions may be employed. The anisotropic resistivity model may be 1D, 2D, or 3D. For more information regarding general modeling and inversion algorithms applicable to EM survey data, reference may be had to D. B. Avdeev, 2005, "Three-dimensional electromagnetic modeling and inversion from theory to application", Surveys in Geophysics, volume 26, pp. 767-799.

The demodulated cross-well telemetry data stream obtained by computer 40 or another processing system provides information regarding the downhole environment and/or BHA/drilling operations. Example uses of the demodulated cross-well telemetry data stream include, but are not limited to, visualization of the BHA position in the downhole environment, visualization of logged parameters as a function of position in the downhole environment, directional drilling guidance. If trajectory updates for the borehole 22A are needed in view of demodulated cross-well telemetry data stream or ranging data, a directional drilling controller (e.g., the computer 40 or another controller) is able to direct steering components of the BHA 24. Example steering mechanisms include steering vanes, a "bent sub," and a rotary steerable system.

Figure 2A:
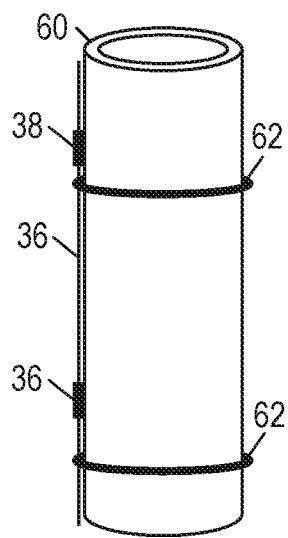
FIGS. 2A-2E are schematic diagram showing illustrative fiber optic sensor deployment options.
Figure 2B:
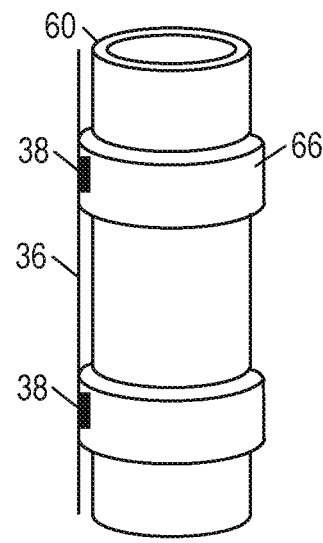
Figure 2C:
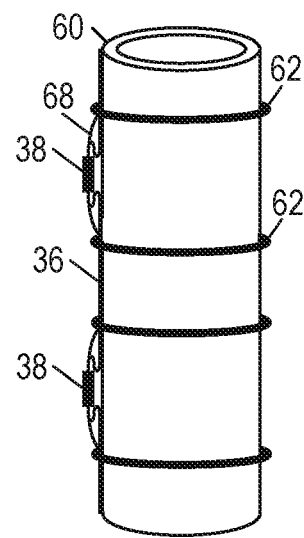

FIGS. 2A-2E show illustrative fiber optic sensor deployment options. For the deployment options represented in FIGS. 2A-2E, the fiber optic sensors 38 are spaced along the fiber optic cable 36 exterior to casing 60. In FIG. 2A, spaced bands 62 are placed around the casing 60 to hold the fiber optic sensors 38 and fiber optic cable 36 in place. In FIG. 2B, the fiber optic sensors 38 are mounted on swellable packers 66. Such packers 66 expand when exposed to downhole conditions, pressing the sensors 38 into contact with the borehole wall. Additionally or alternatively, fins or spacers may be used to space fiber optic sensors 38 away from the casing 60. In FIG. 2C, bow-spring centralizers 68 are used to press the sensors 38 into contact with the borehole walls. To minimize insertion difficulties, a restraining mechanism may hold the spring arms of the bow-spring centralizers 68 against the casing 60 until the casing 60 has been inserted in a corresponding borehole. Thereafter, exposure to downhole conditions or a circulated fluid (e.g., an acid) degrades the restraining mechanism and enables the spring arms of each bow-spring centralizers 68 to extend the sensors 38 against a borehole wall. While only one fiber optic cable 36 is shown in FIGS. 2A-2C, it should be appreciated that multiple fiber optic cables 36 and corresponding sensors could be deployed along casing 60. The use of multiple fiber optic cables 36 and corresponding sensors along casing is one way to increase directional sensitivity for cross-well telemetry and/or other sensing operations.

Figure 2D:
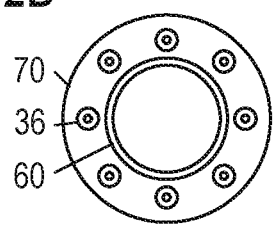
Figure 2E:
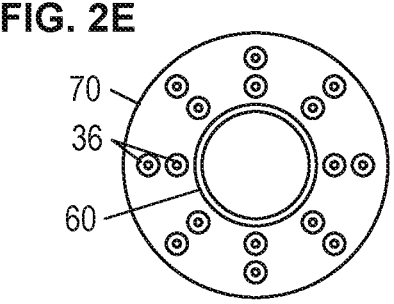

Other extension mechanisms are known in the oilfield and may be suitable for placing the sensors 38 in contact with the borehole wall or into some other desired arrangements such as those illustrated in FIGS. 2D and 2E. In FIG. 2D, multiple fiber optic cables 36 with sensors 38 (not shown) are distributed in the annular space between the casing 60 and a borehole wall 70. In FIG. 2E, the fiber optic cables 36 and corresponding sensors 38 (not shown) have a distribution with axial, azimuthal, and radial variation. The annular space between the casing 60 and the borehole wall 70 could be filled with cement for a more permanent sensor installation. Balloons, hydraulic arms, and projectiles are other contemplated mechanisms for positioning the sensors 38. Besides ensuring that the fiber optic sensors 38 are exposed to the EM field 35 emitted by the EM transmitter 27, it should be appreciated that the particular position and orientation of the sensors 38 in the downhole environment can be considered for cross-well telemetry (to help maximize SNR, bandwidth, communication range, etc.). Accordingly, position sensors, orientation sensors, predetermined information regarding a borehole trajectory, and/or sensor spacing may be used to estimate a fiber optic sensor's position.

Figure 3:
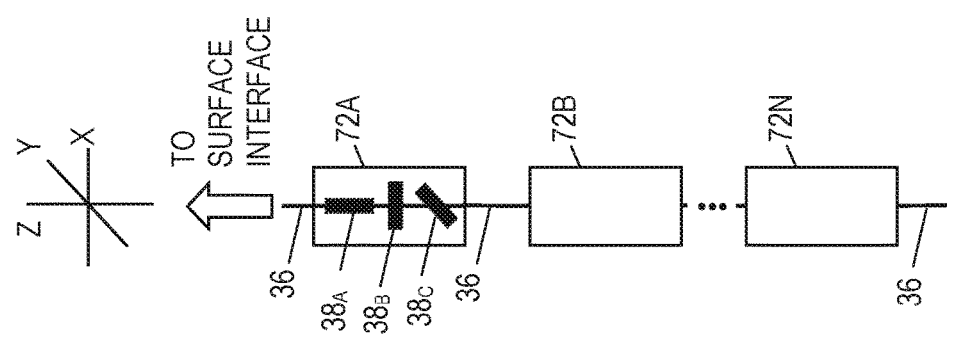
FIG. 3 is a schematic diagram showing an arrangement of fiber optic sensors for cross-well telemetry.

FIG. 3 shows an illustrative arrangement of EM field sensors. More specifically, each of a plurality of EM field sensor groups 72A-72N couples to fiber optic cable 36 and can collect EM field measurements as described herein. In at least some embodiments, each of the sensor groups 72A-72N may include orthogonal EM field sensors $38_A$, $38_B$, $38_C$ (not shown for groups 72B-72N), where sensor $38_A$ is oriented along the z-axis, sensor $38_B$ is oriented along the x-axis, and sensor $38_C$ is oriented along the y-axis. The generated or modulated light output from each of the EM field sensors $38_A$, $38_B$, $38_C$ is conveyed to a surface interface (e.g., interface 16) via fiber optic cable 36, where its characteristics can be converted to an electrical signal and interpreted to decode a data stream included in the EM field sensed by one or more of the sensors $38_A$, $38_B$, $38_C$ in sensor groups 72A-72N. Due to boreholes having trajectories that vary (e.g., vertical and horizontal sections are common), it should be appreciated that the orientation of different sensors $38_A$, $38_B$, $38_C$ for different sensor groups 72A-72N may vary depending on where a given sensor group is relative a varying borehole trajectory. In general, the sensors $38_A$, $38_B$, $38_C$ for a given sensor group are orthogonal to each other, but their particular orientation may vary relative to the sensors in other sensor groups. While multiple sensors 38 are represented for each of the sensor groups 72A-72N, it should be appreciated that individual sensors 38 could be spaced along the fiber optic cable 36. In either case, the particular orientation of individual sensors 38 or sensor groups 72 can affect cross-well telemetry (SNR, bandwidth, communication range, etc.) and may be accounted by careful planning and deployment of the sensors 38 or sensor groups 72 and/or by providing an EM transmitter configuration with multiple orientation options.

Figure 4B:
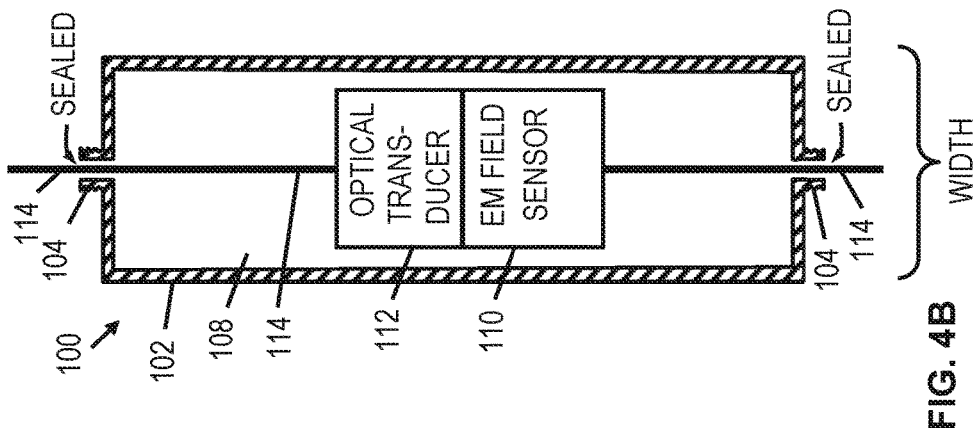
FIG. 4B is a cross-sectional view of the fiber optic sensor unit of FIG. 3A.
Figure 4A:
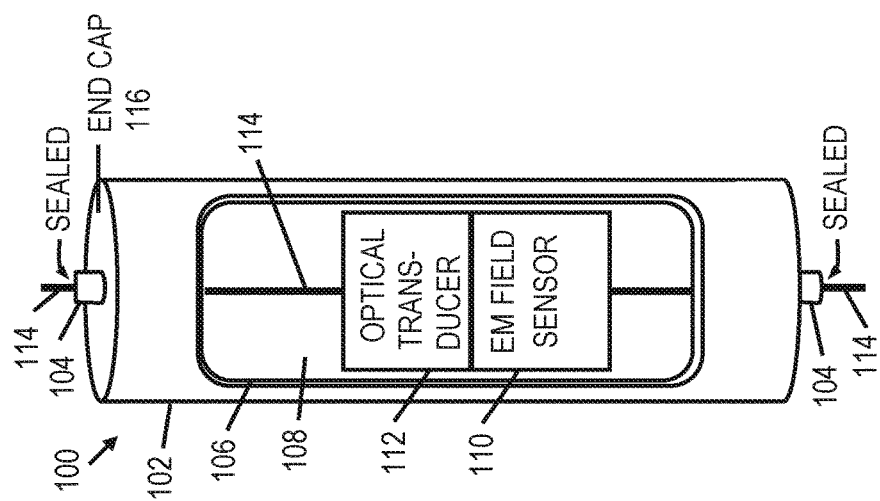
FIG. 4A is a perspective view of a fiber optic sensor unit for cross-well telemetry.

FIG. 4A shows a cutaway view of a fiber optic sensor unit 100. Meanwhile, FIG. 4B shows a cross-sectional view of the field optic sensor unit 100. The fiber optic sensor unit 100 is an example of a fiber optic sensor 38. In both FIGS. 4A and 4B, an optical fiber 114 extends through opposite ends of housing 102. In at least some embodiments, the housing 102 has a hollow cylindrical shape as shown, although other hollow shapes are possible (e.g., rectangular or box shape). Within the housing 102, an EM field sensor 110 and an optical transducer 112 operate to generate a light beam or to modulate a source light beam in presence of an EM field. For example, in one embodiment, the EM field sensor 110 and optical transducer 112 correspond to an electrostrictive or magnetostrictive component bonded to optical fiber 114. In this configuration, the EM field sensor 110 and optical transducer 112 are combined to form an electro-optical transducer or magneto-optical transducer that directly strains or otherwise changes the condition of the optical fiber 114 in presence of an EM field. For the above examples, the electrostrictive or magnetostrictive component could be considered an EM field sensor 110, while the bond between the electrostrictive or magnetostrictive component and the optical fiber 114 could be considered an optical transducer. As used herein, the term "bonded" refers to any physical or adhesive-based connection such that deformation of the magnetostrictive component causes a corresponding strain to the optical fiber 114. Using an electrostrictive or magnetostrictive component to jacket optical fiber 114 such that the optical fiber 114 is strained in response to deformation of the electrostrictive or magnetostrictive component is an example of a suitable bond.

The above electro-optical transducer and magneto-optical transducer configurations are suitable for optical interrogation, where a source light beam in the optical fiber 114 is modulated by the amount of strain applied to the optical fiber 114 by the electrostrictive or magnetostrictive component in presence of an EM field. Another example of electro-optical transducer and magneto-optical transducer configurations involve wrapping optical fiber 114 around an electrostrictive or magnetostrictive component (e.g., a cylinder) such that a source light beam conveyed along the optical fiber 114 is modulated by the amount of strain applied to the optical fiber 114 by the electrostrictive or magnetostrictive component in presence of an EM field.

In another embodiment, the EM field sensor 110 corresponds to an inductive coil, where a voltage is induced in the coil in presence of a magnetic field. In such case, the optical transducer 112 may correspond to a light-emitting diode (LED) configuration suitable for optical monitoring operations. Alternatively, configurations suitable for optical interrogation operations may employ an optical transducer 112 that modulates a source light beam based on a voltage induced in a coil by a magnetic field. Some example optical transducers 112 suitable for modulating a source light beam based on an induced voltage include: 1) a piezoelectric component bonded to a fiber laser; 2) a hinged reflective surface; 3) a piezoelectric component that bends or strains an optical fiber; 4) an optical resonator; and 5) a lithium niobate modulator. While the above EM field sensor examples are able to detect magnetic field variations, it should be appreciated that other EM field sensors may be configured to detect electric field variations.

In at least some embodiments, each fiber optic sensor unit 100 can be configured to measure the triaxial electric and/or magnetic fields. In some embodiments, the magnetic field sensor can consist of an optical fiber bonded to or jacketed by a magnetorestrictive material. Some common magnetostrictive materials include cobalt, nickel, and iron metals, and their alloys, e.g., Metglass and Terfenol-D. When exposed to a time-varying magnetic field, the deformation (i.e., change in shape) in the magnetorestrictive material induces a strain on the optical fiber, which can be remotely interrogated using any of the fiber-optic strain measurement methods including but not limited to inteferometric, fiber Bragg grating (FBG), fiber laser strain (FLS), and extrinsic Fabry-Perot interferometric (EFPI) methods. The strain is proportional to the applied magnetic field. In at least some embodiments, the sensor is operated such that the strain is linearly proportional to the applied magnetic field.

In recent experiments in which magnetic field sensors were characterized for permanent deployment in waterflood monitoring, the minimum detectable magnetic field required to drive Terfenol-D or Metglas magnetorestriction is approximately 30-40 µA/m. In other embodiments, an electric field sensor may include an optical fiber bonded to or jacketed by an electrorestrictive material. Some common electrorestrictive materials include lithium niobate and PZT. When the earth's potential sensed between an electrode pair is applied to the electrorestrictive material, the deformation (i.e., change in shape) in the electrorestrictive material induces a strain on the optical fiber, which can be remotely interrogated using fiber-optic strain measurement methods such as inteferometric, FBG, FLS, and EFPI methods. In at least some embodiments, the strain is proportional to the applied electric field. For example, the sensor may operate such that the strain is linearly proportional to the earth's potential field. In recent experiments in which electric field sensors where characterized for permanent deployment in waterflood monitoring, the minimum detectable potential difference required between an electrode pair to drive PZT electrorestriction is approximately 1 µV.

In different embodiments, each fiber optic sensor unit 100 may include one EM field sensor 110 as shown or may include multiple EM field sensors 110. In other words, each fiber optic sensor unit 100 can be constructed to measure one, two, or three directional components of an EM field. In addition to having one or more EM field sensors 110, each fiber optic sensor unit 100 may include one or more optical transducers 112 placed within a single sensor unit housing. In such case, the component orientation (e.g., orthogonal, collinear) and/or position (e.g., staggered) may vary to ensure at least one EM field sensor is oriented to enable cross-well telemetry.

When assembling a fiber optic sensor unit 100, the housing 102 may have at least two parts. For example, one of the ends of the housing 102 may initially be open to allow the EM field sensor 110, the optical transducer 112, and the optical fiber 114 to be positioned inside the housing 102. Once the EM field sensor 110, the optical transducer 112, and the optical fiber 114 are positioned as desired, an end cap 116 with a hole for the optical fiber 114 and/or connecter 104 is added to cover the open end of the housing 102. The end cap 116 may be coupled to the rest of the housing 102 using welds, threads, adhesive, etc.

In at least some embodiments, the housing 102 provides space 108 around the EM field sensor 110 and/or optical transducer 112 so that the EM field sensor 110 and/or optical transducer 112 are free to deform in presence of an EM field. Without limitation to other embodiments, an example fiber optic sensor unit 100 has a maximum width of about 1 inch, a housing thickness of about 2 mm, and a maximum length of about 4 inches. A plurality of such fiber optic sensor units 100 may be added (e.g., via splicing) to a tubing encapsulated cable (TEC), which typically have an outer diameter of approximately 1 cm. When assembly is complete, a modified TEC with distributed fiber optic sensor units 100 may be deployed downhole in a cross-well telemetry environment as described herein.

In at least some embodiments, the housing 102 includes connectors 104 at opposite ends where the optical fiber 114 extends through the housing 102. For example, the connectors 104 may be part of the housing and/or end caps 116. Alternatively, the connectors 104 may be added to end cap 116 using welds, threads, adhesive, sealants, etc. The connectors 104 enable a fiber optic sensor unit 100 to couple to a cable (e.g., cable 36). As an example, the connector 104 may be threaded or otherwise configured to mate with a corresponding connector of a cable. In addition, the optical fiber 114 extending from the housing 102 at opposite ends may be spliced with optical fibers of a cable to form a continuous optical waveguide. Available splicing techniques may be employed to create a fiber optic cable (e.g., cable 36) with a plurality of such sensor units 100 distributed along the length of the cable. For more information regarding fiber optic sensor housing options (size, material, wall thickness) and fill options, reference may be had to PCT/US2014/038552, entitled "Optical Magnetic Field Sensor Units for a Downhole Environment" and filed May 19, 2014.

In at least some embodiments, the fiber optic sensor units 100 can be fabricated in such a manner to enable efficient mass production and ease of deployment as part of a permanent EM monitoring system. For example, sensor units 100 and a corresponding cable (e.g., cable 36) can be pre-fabricated in a factory and delivered on a cable reel for ease of deployment at the well site during the completion of a well. A cross-well telemetry system employing sensor units 100 can be simultaneously deployed with other fiber optic-based sensors including, but not limited to, acoustic sensors, temperature sensors, pressure sensors, strain sensors, chemical sensors, current sensors and/or electric field sensors.

Figure 5:
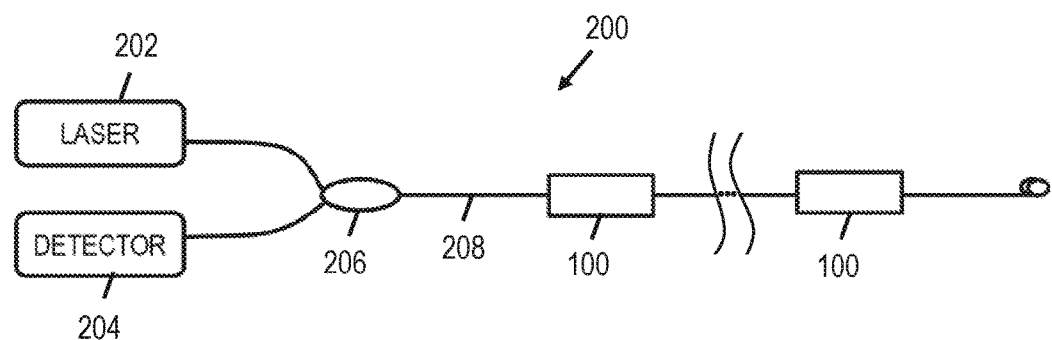
FIG. 5 is a schematic diagram showing an illustrative optical interrogation system.

In accordance with at least some embodiments, a plurality of fiber optic sensor units 100 can be deployed along the same optical fiber and interrogated or monitored through at least one method of multiplexing. FIG. 5 shows an illustrative optical interrogation system 200. In system 200, various fiber optic sensor units 100 are distributed along optical fiber(s) 208 or a corresponding cable (e.g., cable 36). The optical fiber(s) 208 is coupled to a laser 202 and a detector 204 via a coupler 206. In at least some embodiments, the laser 202 and the detector 204 are part of an interrogation interface (e.g., interface 16 of FIG. 1). In operation, one or more of the fiber optic sensor units 100 modulate source light beams emitted by the laser 202 in accordance with an EM field present at the location of each of the sensor units 100.

The detector 204 receives the modulated source light beams and recovers EM field measurements that convey a data stream as described herein. The laser 202, the detector 204, the fiber optic sensor units 100, and/or the optical fiber(s) 208 may be configured for multiplexing options such as TDM, WDM, and/or MDM. In principle the number of fiber optic sensor units 100 in system 200 is only limited by the attenuation of light propagating along the optical fiber(s) 208. Certain contemplated embodiments include hundreds of fiber optic sensor units 100 along a given optical fiber 208.

Figure 6:
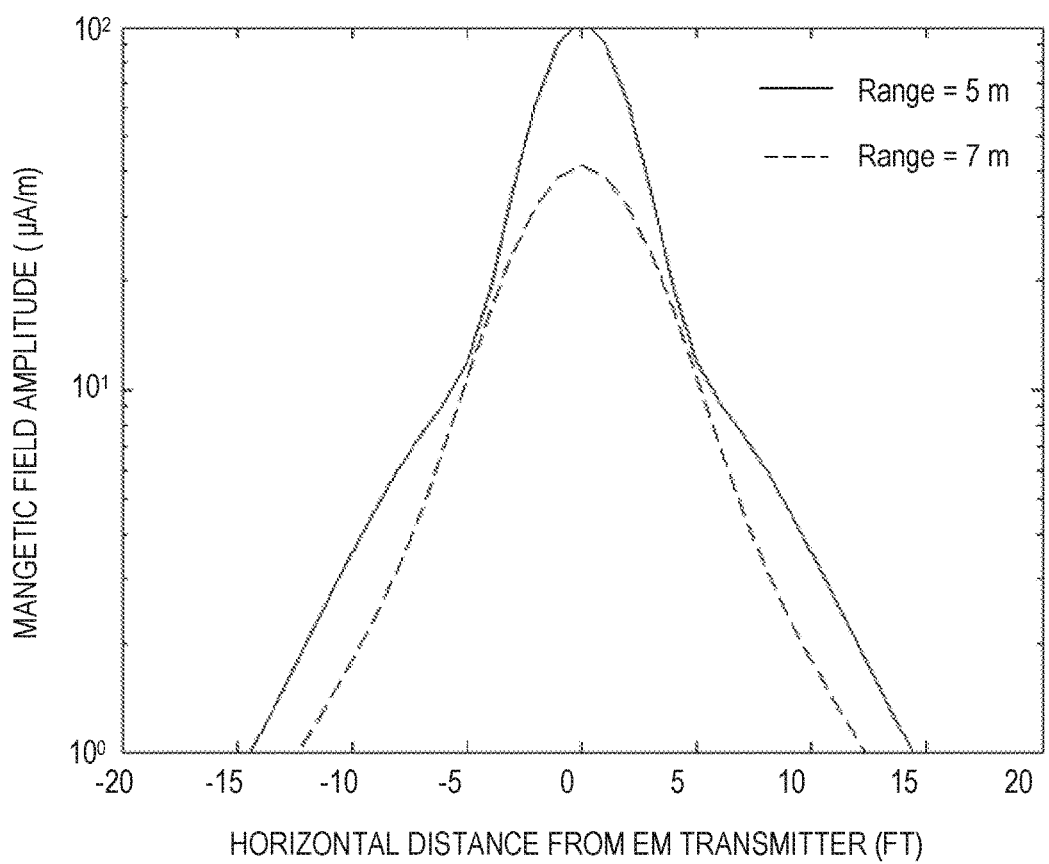
FIG. 6 is a graph showing illustrative magnetic field measurement characteristics.

FIG. 6 is a graph 300 showing illustrative magnetic field measurement characteristics. For the measurements of FIG. 6, an x-directed EM transmitter having a 10 turn loop antenna with diameter of 7", and operated at 1 kHz with a current of 0.5 A is assumed. Further, the effective permeability of the loop antenna core is that of free space, and the range of the EM transmitter varies from 5 meters to 7 meters above an array of x-directed fiber optic sensors. Further, the formation is assumed to have a uniform resistivity of 10 ohm-m. For a range of 5 meters, magnetic fields are detectable ±10 meters (i.e., a lateral offset of 10 meters or less results in magnetic field amplitudes of 30-40 µA/M from the EM transmitter). For a range of 7 meters, magnetic fields are detectable ±7 meters (i.e., a lateral offset of 7 meters or less results in magnetic field amplitudes of 30-40 µA/M) from the EM transmitter). Thus, if fiber optic sensors (e.g., sensors 38 or sensor units 100) are placed, for example, every 10 meters (30 feet or so) along a borehole (e.g., borehole 22B), the EM fields transmitted by an EM transmitter (e.g., transmitter 27) in a nearby borehole (e.g., borehole 22A) would be detected by at least two of the fiber optic sensors.

Figure 7:
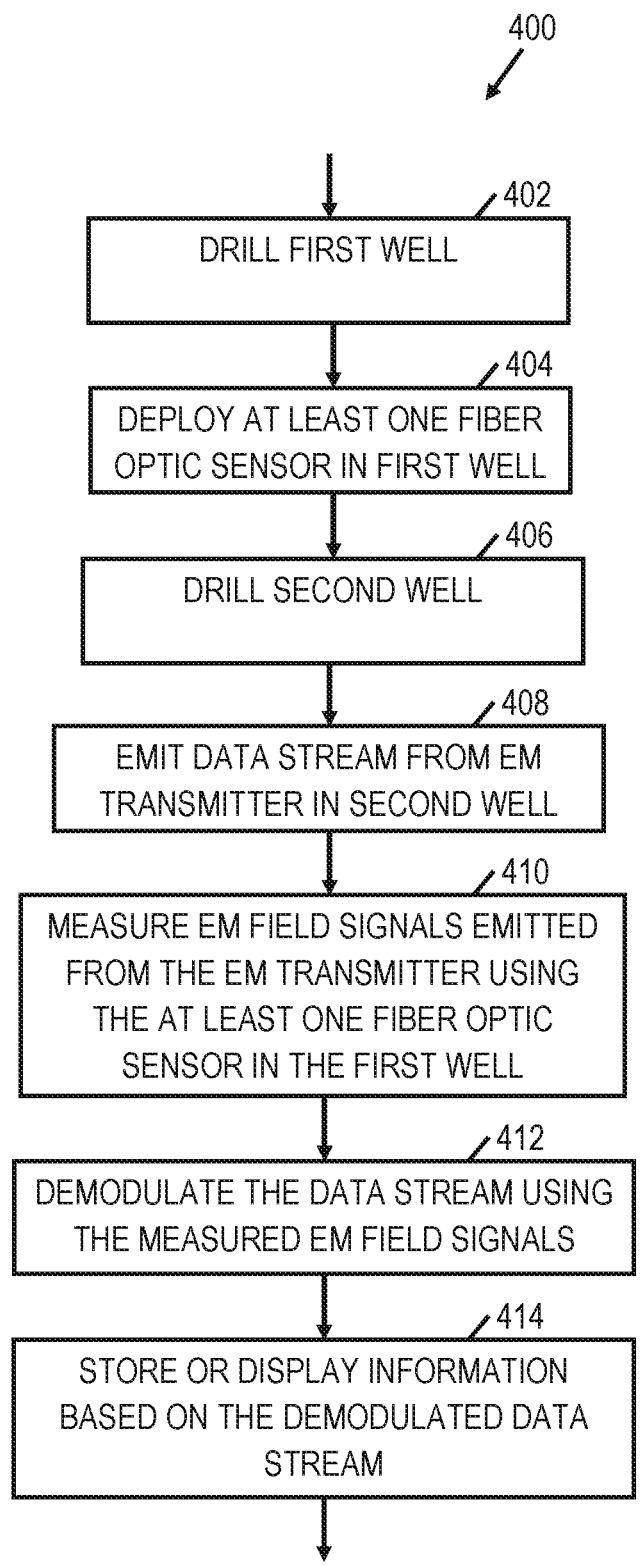
FIG. 7 is a flowchart showing an illustrative cross-well telemetry method employing fiber optic sensors.

FIG. 7 is a flowchart showing an illustrative cross-well telemetry method 400 employing fiber optic sensors. In the method 400, a first well is drilled at block 402. At block 404, at least one fiber optic sensor is deployed in the first well. The at least one fiber optic sensor may be deployed temporarily or permanently as described herein. At block 406, a second well is drilled. At block 408, a data stream is emitted by from an EM transmitter in the second well. At block 410, EM fields signals emitted from the EM transmitter in the second well are measured by the at least one fiber optic sensor in the first well. The EM field measurements include the data stream and are conveyed to earth's surface for storage and processing as described herein. At block 412, the data stream is demodulated using the measured EM field signals. At block 414, information is stored or displayed based on the demodulated data stream. For example, the demodulated data stream may be used for visualization of the BHA position in the downhole environment, visualization of logged parameters as a function of position in the downhole environment, directional drilling guidance, and/or other operations.

In at least some embodiments, the cross-well telemetry method 400 may be performed using components that have a dual role. For example, the EM transmitter may be used for the cross-well telemetry operations described herein as well as for collecting EM survey data or ranging data. Such EM survey data provides information about the EM properties of a formation and/or can track the movement of fluid in a formation, etc. Meanwhile, ranging data can be used for directional drilling guidance. Further, the fiber optic cable coupled to the fiber optic sensors may be used to convey EM field measurements used for cross-well telemetry as described herein as well as for collecting distributed sensing parameters such as temperature, pressure, acoustic activity, or other downhole parameters. Further, the fiber optic cable may be used to convey EM field measurements used for ranging operations. Further, the fiber optics sensors could be used to perform the cross-well telemetry operations as described herein as well as to collect EM survey data (e.g., during production and reservoir monitoring operations) or ranging measurements. By using components with a dual role, the overall cost of data collection and telemetry operations is reduced compared to using separate systems.

Embodiments disclosed herein include:

A: A system that comprises a drillstring with an electromagnetic (EM) transmitter in a first borehole, at least one fiber optic sensor deployed in a second borehole, and a processor configured to demodulate a data stream emitted by the EM transmitter based on EM field measurements collected by the at least one fiber optic sensor.

B. A method that comprises emitting a data stream by an EM transmitter in a first borehole, obtaining EM field measurements corresponding to the data stream using at least one fiber optic sensor deployed in a second borehole, and demodulating the data stream based on the EM field measurements.

Each of the embodiments, A and B, may have one or more of the following additional elements in any combination. Element 1: further comprising a directional drilling controller configured to update a trajectory for the first borehole based at least in part on information conveyed in the data stream. Element 2: further comprising a monitor in communication with the processor, wherein the monitor displays formation properties based at least in part on information conveyed in the data stream. Element 3: wherein the at least one fiber optic sensor is permanently deployed downhole along a fiber optic cable that extends along a casing exterior in the second borehole. Element 4: wherein the at least one fiber optic sensor is temporarily deployed downhole along a fiber optic cable that extends inside a casing in the second borehole. Element 5: wherein the at least one fiber optic sensor is deployed along a fiber optic cable used for distributed sensing of temperature, pressure, chemicals, or acoustic activity. Element 6: wherein the at least one fiber optic sensor resides within a protective housing. Element 7: wherein the at least one fiber optic sensor comprises a magnetic field sensor. Element 8: wherein the at least one of fiber optic sensor comprises an electric field sensor. Element 9: wherein the EM transmitter is part of a bottomhole assembly (BHA), and wherein the EM transmitter is used to collect EM survey data and for cross-well telemetry.

Element 10: further comprising updating a drilling trajectory for the first borehole based at least in part on information conveyed in the data stream. Element 11: further comprising displaying formation properties based at least in part on information conveyed in the data stream. Element 12: further comprising permanently deploying the at least one fiber optic sensor downhole along a fiber optic cable that extends along a casing exterior in the second borehole. Element 13: further comprising temporarily deploying the at least one fiber optic sensor downhole along a fiber optic cable that extends inside a casing in the second borehole. Element 14: further comprising deploying the at least one fiber optic sensor downhole along a fiber optic cable used for distributed sensing of temperature, pressure, chemicals, or acoustic activity. Element 15: further comprising deploying the at least one fiber optic sensor downhole to have a predetermined orientation relative to the EM transmitter. Element 16: wherein obtaining EM field measurements comprises outputting a voltage in response to a magnetic field corresponding to an EM field emitted by the EM transmitter, and emitting a light based on the voltage or modulating an interrogation light based on the voltage. Element 17: wherein obtaining EM field measurements comprises outputting a voltage in response to an electric field corresponding to the EM field emitted by the EM transmitter, and emitting a light based on the voltage or modulating an interrogation light based on the voltage. Element 18: further comprising using the EM antenna to collect EM survey data and to perform cross-well telemetry.

Numerous variations and modifications will become apparent to those skilled in the art once the above disclosure is fully appreciated. The ensuing claims are intended to cover such variations where applicable.

What is claimed is:

1. A system that comprises:
   a drillstring with a bottom hole assembly;
   an electromagnetic (EM) transmitter disposed on the bottom hole assembly in a first borehole and configured to emit an EM field and a data stream;
   a plurality of fiber optic sensors deployed in a second borehole, wherein each of the plurality of fiber optic sensors are configured to measure the EM field and the data stream; and
   a processor configured to demodulate the data stream emitted by the EM transmitter based on EM field measurements collected by the at least one fiber optic sensor and find a distance from the EM transmitter to each of the plurality of fiber optic sensors to determine a position of the bottom hole assembly in the first borehole.

2. The system of claim 1, further comprising a directional drilling controller configured to update a trajectory for the first borehole based at least in part on information conveyed in the data stream.

3. The system of claim 1, further comprising a monitor in communication with the processor, wherein the monitor displays formation properties based at least in part on information conveyed in the data stream.

4. The system of claim 1, wherein at least one fiber optic sensor is permanently deployed downhole along a fiber optic cable that extends along a casing exterior in the second borehole.

5. The system of claim 1, wherein at least one fiber optic sensor is temporarily deployed downhole along a fiber optic cable that extends inside a casing in the second borehole.

6. The system of claim 1, wherein at least one fiber optic sensor is deployed along a fiber optic cable used for distributed sensing of temperature, pressure, chemicals, or acoustic activity.

7. The system according to claim 1, wherein at least one fiber optic sensor resides within a protective housing.

8. The system according to claim 1, wherein at least one fiber optic sensor comprises a magnetic field sensor.

9. The system according to claim 1, wherein at least one fiber optic sensor comprises an electric field sensor.

10. The system according to claim 1, wherein the EM transmitter is used to collect EM survey data and for cross-well telemetry.

11. A method that comprises:
    emitting a data stream and an electromagnetic ("EM") field by an EM transmitter disposed on a bottom hole assembly in a first borehole;
    taking a measurement of the EM field and receiving the data stream with at least one fiber optic sensor of a plurality of fiber optic sensors deployed in a second borehole;
    demodulating the data stream;
    ranging a distance between the EM transmitter and each of the plurality of fiber optic sensors based on the EM field measurements at each of the plurality of fiber optic sensors; and
    determining the position of the bottom hole assembly in the first borehole.

12. The method of claim 11, further comprising updating a drilling trajectory for the first borehole based at least in part on information conveyed in the data stream.

13. The method of claim 11, further comprising displaying formation properties based at least in part on information conveyed in the data stream.

14. The method of claim 11, further comprising permanently deploying the at least one fiber optic sensor downhole along a fiber optic cable that extends along a casing exterior in the second borehole.

15. The method of claim 11, further comprising temporarily deploying the at least one fiber optic sensor downhole along a fiber optic cable that extends inside a casing in the second borehole.

16. The method of claim 11, further comprising deploying the at least one fiber optic sensor downhole along a fiber optic cable used for distributed sensing of temperature, pressure, chemicals, or acoustic activity.

17. The method of claim 11, further comprising deploying the at least one fiber optic sensor downhole to have a predetermined orientation relative to the EM transmitter.

18. The method according to claim 11, wherein taking the measurement of the EM field comprises:
    outputting a voltage in response to a magnetic field corresponding to an EM field emitted by the EM transmitter, and
    emitting a light based on the voltage or modulating an interrogation light based on the voltage.

19. The method according to claim 11, wherein taking the measurement of the EM field comprises:
    outputting a voltage in response to an electric field corresponding to the EM field emitted by the EM transmitter, and emitting a light based on the voltage or modulating an interrogation light based on the voltage.

20. The method according to claim 11, further comprising using an EM antenna to collect EM survey data and to perform cross-well telemetry.

* * * * *